Charles M. Neal INVENTOR.

Charles M. Neal INVENTOR.

BY

ATTORNEY

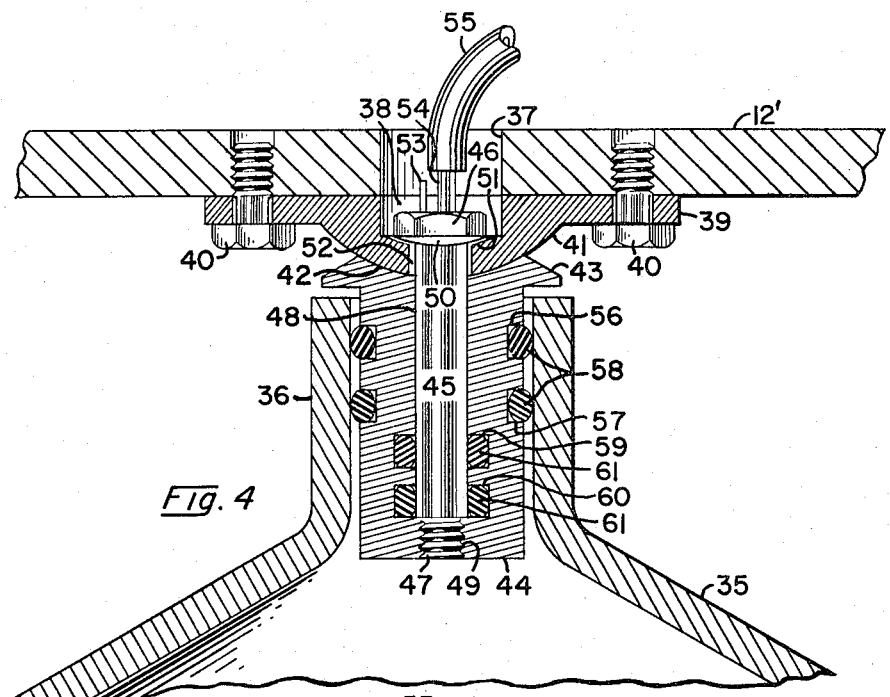
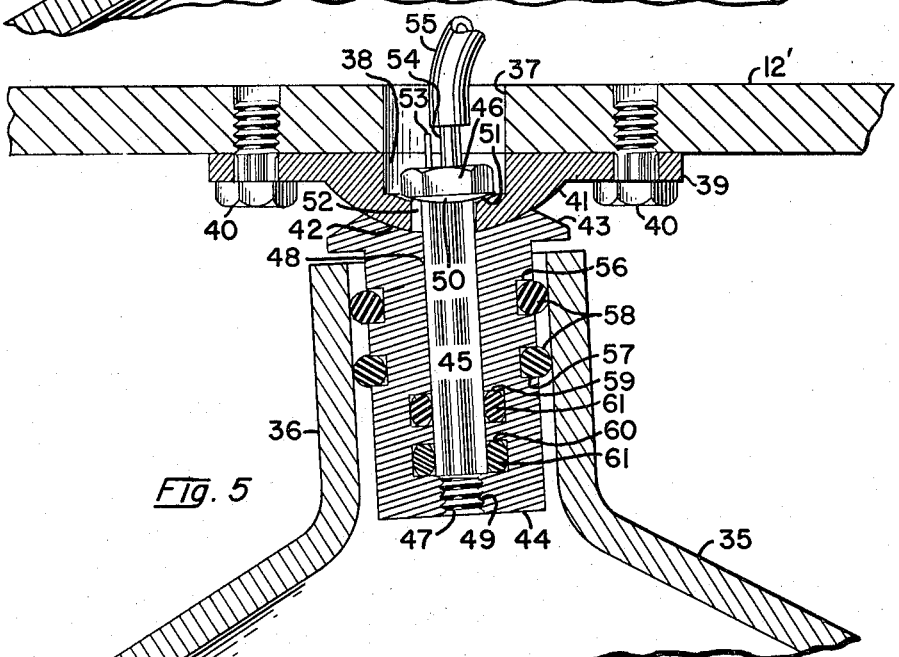

United States Patent Office 3,377,841
Patented Apr. 16, 1968

3,377,841
HYDROSTATIC AND DYNAMIC
TESTING APPARATUS
Charles M. Neal, Huntsville, Ala., assignor to Thiokol
Chemical Corporation, Bristol, Pa., a corporation of
Delaware
Filed Nov. 12, 1964, Ser. No. 410,432
5 Claims. (Cl. 73—37)

ABSTRACT OF THE DISCLOSURE

An apparatus for pressure testing a rocket motor case including a stand having upper and lower load bearing plates for retaining the rocket motor case in fixed position and having a floating piston entering the aft end of the rocket motor case, with a fluid supply line connected to the floating piston for introducing fluid under pressure into the rocket motor case.

---

This invention relates to testing apparatus that may be used to subject a motor case for a solid propellant rocket motor to the same conditions that would exist if the motor case were being static tested.

The static testing of rocket motors is a conventional procedure which involves the harnessing of a live rocket motor, i.e., a rocket motor case having a live propellant therein, to a fixed test stand. Thus, when the live propellant is ignited, the rocket motor will be subjected to the conditions that would exist during free flight of the rocket motor.

The static testing of rocket motors will furnish several areas of information, but one of the most important areas that is considered is the manner in which the motor case will react to such a test.

The gauge of the metal to be used for the motor case may be determined by such a test, and while weight is important in determining the strength of the motor case, it is also important in determining the ability of the rocket motor to perform as required.

The motor case must be light as possible yet must be strong enough to withstand the internal pressures that are created by the combustion of the solid propellant.

There are many safety hazards that are involved in static testing a live rocket motor, and such testing must be made in specially prepared explosion-proof areas and the ignition of the solid propellant must be accomplished by remote control to properly protect the technical personnel performing the static test.

The present invention was designed to subject a motor case to the same conditions that exist during a static test without the necessity of having incorporated in the motor case a live propellant. The apparatus, therefore, overcomes many of the safety hazards that exist during a static test.

The present invention provides for the introduction of a fluid into a motor case that is retained and restrained within a test stand that will permit the internal pressure within the motor case to subject the motor case to the same conditions as would exist when the same motor case with a live propellant therein would be static tested.

It is an object of the invention, therefore, to provide a hydrotest apparatus that will subject a rocket motor case to the same conditions that would exist if the motor case were static tested.

It is another object of the invention to provide a hydrotest apparatus that will test load the forward thrust skirt of a rocket motor case while, at the same time, permitting the rocket motor case to expand without restriction under the internal pressure to which the motor case is subjected, as well as to permit the motor case nozzle joint to flex normally under the applied pressure.

Normally, hydrotest apparatus are designed to prevent the flexing that would ordinarily exist in the case nozzle joint of the motor case during static test, but the present invention has been designed to include a floating piston that permits free flexing of the motor case and the nozzle joint so that the existing conditions of the test utilizing the instant invention will more nearly approach the conditions that would exist during static testing of a rocket motor.

With the above and other objects and advantages in view, the invention consists of the novel details of construction, arrangement and combination of parts more fully hereinafter described, claimed and illustrated in the accompanying drawings in which:

FIGURE 4 is a view, similar to FIGURE 2, illustrating another form of the invention, and FIGURE 5 is a view, similar to FIGURE 3, wherein the flexing of the nozzle adapter in relation to the floating piston of the form of the invention shown in FIGURE 4 is illustrated.

Figure 1:
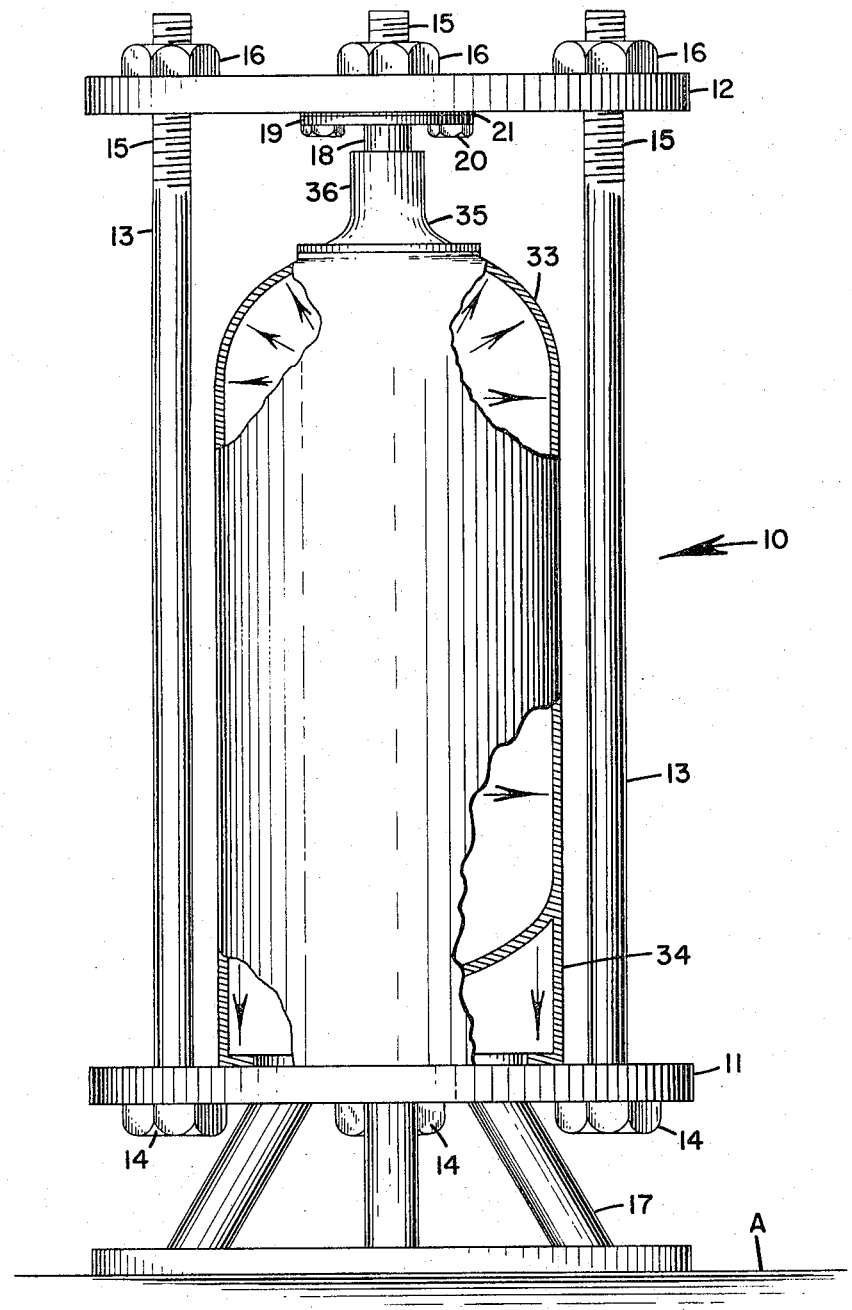
FIGURE 1 is an elevational view of one form of the apparatus embodying the invention with certain parts removed and broken away and in section to more clearly show by arrows the directions of the internal pressures that exist in a motor case during the hydrostatic testing thereof.

Referring more in detail to the drawings wherein like parts are designated by like reference numerals, the reference numeral 10 is used to generally designate a hydrostatic and dynamic testing apparatus embodying the instant invention.

Figure 2:
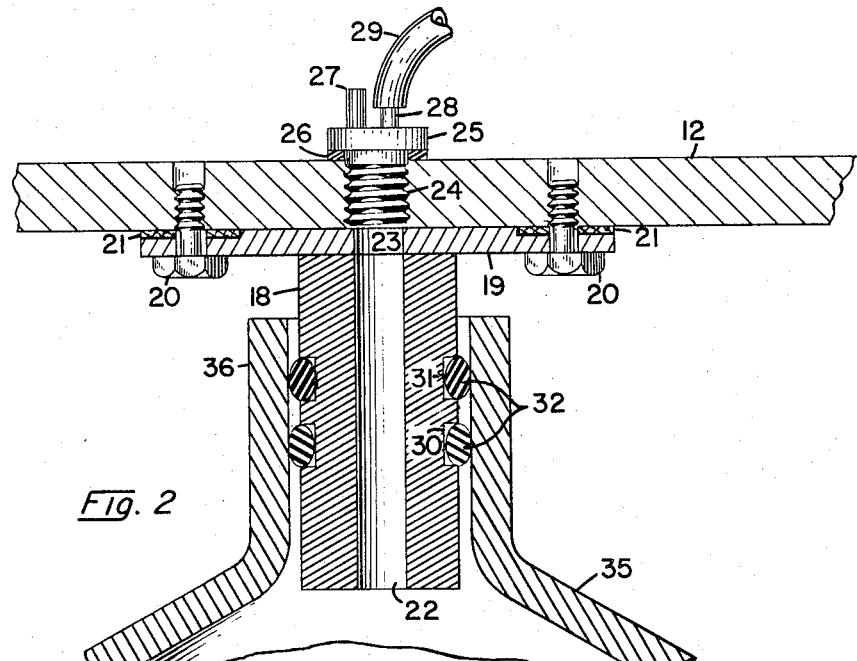
FIGURE 2 is an enlarged detailed fragmentary sectional view showing the cooperation of the floating piston of the invention with a nozzle adapter of a rocket motor case.
Figure 3:
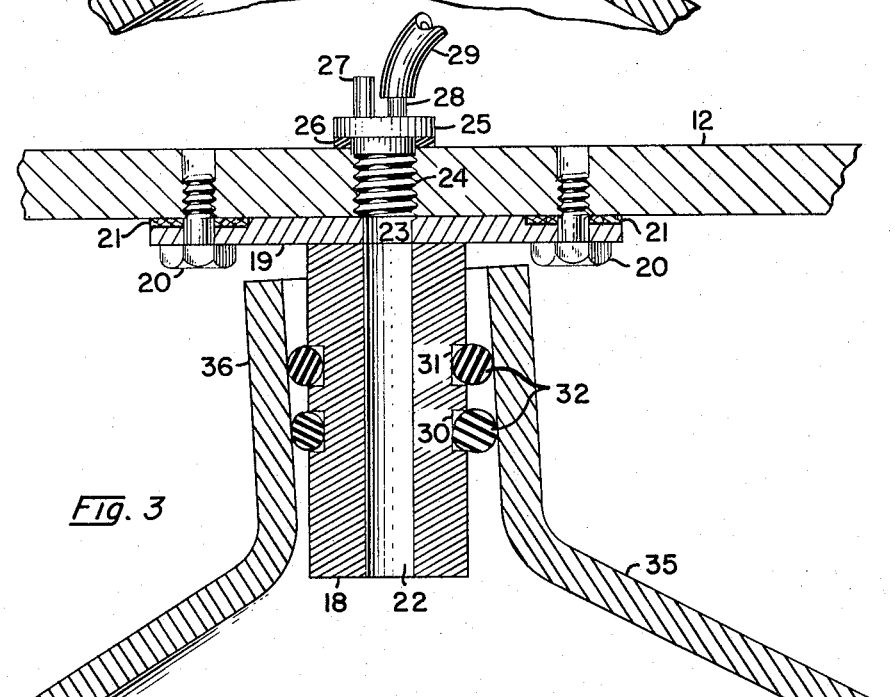
FIGURE 3 is a view, similar to FIGURE 2, wherein the flexing of the nozzle adapter in relation to the floating piston is illustrated.

The apparatus 10, shown in FIGURES 1 to 3 inclusive and more particularly in FIGURE 1, comprises a lower load bearing plate 11 and an upper load bearing plate 12. Extending between the load plates 11 and 12 in perpendicular relation thereto and in parallel-spaced relation to each other are a plurality of tie rods 13. Each of the tie rods 13 is provided at one end thereof with a head portion 14 which abuts the lower surface of the bottom load plate 11 and prevents vertical separation of the tie rods 13 therefrom. The opposite end of each tie rod 13 is provided with screw threads 15 on which are threaded suitable nuts 16. The nuts 16 will, when manipulated, tend to draw the load plates 11 and 12 toward each other and engaging the upper surface of the load plate 12 will also prevent separation thereof from the tie rods 13. While the use of screw threads 15 and nuts 16 has been illustrated, it is conceivable that other suitable fastening means may be utilized for the same purpose as described. The shape, size and strain resistant qualities of the previously described components will vary as to the overall surface area of the piston where rocket motor cases having various size openings to which the nozzle or nozzle adapter are to be attached as well as to the size of the motor case.

Rigidly secured to the undersurface of the bottom load plate 11 is a supporting assembly 17 which is used mainly to elevate the bottom load plate 11 above the ground surface A and the assembly 17 is not to be limited to the paricular structure shown in FIGURE 1 but may be of any structure that will adequately support the apparatus 10 without any danger of the collapse thereof.

The essence of this invention is based on what is termed in this particular art a floating piston 18. The piston 18 is rigidly secured to a head plate 19 which in turn is rigidly secured to the top load plate 12 by bolts 20. To prevent any leakage of fluid between the load plate 12 and the head plate 19, a sealing gasket 21 having spaced openings therein to receive the bolts 20 is interposed between the upper load plate 12 and head plate 19, as shown in FIGURES 1 and 2. It is also conceivable that other suitable sealing means may be utilized, such as O-rings or the like.

The piston 18 is provided with a medially-disposed bore 22 which is in communication with an opening 23 in the head plate 19 and a threaded bore 24 in the upper load plate 12. A screw plug 25 is threaded into the threaded bore 24, and a sealing gasket 26 is interposed between the plug 25 and the upper surface of the upper load plate 12. The plug 25 is provided with an outlet tube 27 and an inlet tube 28 to which is connected a supply line 29 for a fluid under pressure. A pair of spaced, parallel annular grooves 30 and 31 are provided in the outer surface of the plug 25, and a sealing O-ring 32 is placed in each of the grooves 30 and 31 for a purpose to be later described.

In the operation of the apparatus 10, a motor case 33 having a thrust skirt 34 integral therewith at one end thereof is positioned intermediately of the tie rods 13 with the thrust skirt 34 resting on the bottom load plate 11. A nozzle or nozzle adapter 35 is rigidly secured to the opposite end of the motor case 33, and this operation may be accomplished before or after the motor case 33 is positioned within the apparatus 10.

The upper load plate 12 is lowered into position so that the piston 18 enters the throat portion 36 of the nozzle or nozzle adapter 35, and the nuts 16 are then tightened to rigidly sustain the top load plate 12 in the position shown in FIGURE 1.

Fluid under pressure is then introduced into the motor case 33 by means of the supply line 29 which has direct communication with the interior of the motor case 33 by means of the inlet 28 in the plug 25, the opening 23 in the head plate 19, and bore 22 in the piston 18.

The pressure created by the fluid introduced into the motor case will be directed toward the entire interior surface of the motor case, as shown by arrows in FIGURE 1, as well as against the thrust skirt 34 of the rocket motor case 33, as also shown by the arrows in FIGURE 1. Thus, while the directions of opposing forces within the motor case 33 may equalize each other, the force applied to the piston 18 and the force applied to the thrust skirt 34 will both remain positive and will not balance one another.

The O-rings 32 will prevent the escape of the fluid from the motor case 33, and the outlet 27 can be closed by any conventional means to prevent escape of the fluid from the motor case 33.

Some motor cases under test have, at times, assumed the shape of a banana; and thus the nozzle or nozzle adapter will cant or distort from the perpendicular to a position somewhat similar to that shown in FIGURE 3. The nozzle or nozzle adapter 35 can also move upwardly or downwardly on the piston 18 as the pressure within the motor case 33 causes the motor case 33 to react to the strain placed thereon. The force created by the motor case 33 is transmitted by the piston 18 to the top load plate 12 through the tie rods 13 to the bottom load plate 11 and such force is resisted by the thrust skirt 34.

The motor case 33 is thus permitted to expand and elongate freely as if it were being static tested and may be tested if desired until the motor case 33 is ruptured. Many types of recordings of the test are made under existing conditions, but records, such as strain gage outputs, etc., are much more accurate than those that are made during conventional static testing with less safety hazards present during the test.

In FIGURES 4 and 5, a modification of the floating piston is illustrated. Except for the additional flexibility that is provided for the floating piston, the remainder of the apparatus is as previously described.

In this form of the invention, the upper loadbearing plate 12' is similar to the upper load bearing plate 12, except that an opening 37 is provided in the approximate center thereof and this opening 37 is aligned with a cavity 38 that is provided in a head plate 39 that is rigidly secured to the load plate 12' by bolts 40.

The head plate 39 on the outer surface thereof is provided with a circular semi-spherical or convex-shaped projection 41 which nests within a concave-shaped cavity 42 in an enlarged head portion 43 on the upper end of a floating piston 44.

A hollow bolt 45 having an enlarged head 46 at one end and screw threads 47 at the opposite ends secures the piston 44 to the head plate 41. This is accomplished by means of a bore 48 in the piston 44 and a threaded socket 49 in the lower end of the piston 44.

The head 46 of the bolt 45 has a convex-shaped undersurface 50 which nests in a concavity 51 in the bottom of the cavity 38; and with an enlarged opening 52 in the head plate 39 that communicates with the cavity 38 therein and through which the bolt 45 extends, the piston 44 may pivot in relation to the head plate 39, as shown in FIGURE 5.

The bolt 45 in the head 46 thereof is provided with an outlet tube 53 and an inlet tube 54 to which is connected a supply line 55 for a fluid under pressure. A pair of spaced parallel annular grooves 56 and 57 are provided in the outer surface of the piston 44, and a sealing O-ring 58 is placed in each of the grooves 56 and 57 for a purpose to be later described.

A second pair of spaced parallel annular groves 59 and 60 are provided in the piston 44 in circumjacent relation to the bore 48 in the piston 44, and a sealing O-ring 61 positioned in each of the grooves 59 and 60 engages the bolt 45 and prevents any escape of the fluid under pressure through the bore 48.

The throat 36 of the nozzle or nozzle adapter 35 is positioned on the piston 44 in the same manner as previously described for the piston 18, and the hydrotest is carried out as previously described. Under extreme moments of elongation, the free edge of the throat portion 36 of the nozzle or nozzle adapter 35 may engage the enlarged head portion 43 on the piston 44 and prevent further movement of the nozzle or nozzle adapter 35 to prevent the free edge thereof from engaging the projection 41 and preventing the free movement of the piston 44 in relation to the head plate 39.

The apparatus, as thus described, permits hydrotesting of a motor case to simulate static test firings; and it is believed that the manner of use and structure of the apparatus will be clear to those skilled in the art, it also being understood that variations in the mode of operation and the structure of the apparatus may be adhered to providing such variations fall within the spirit of the invention and the scope of the appended claims.

Having thus described the invention, what is claimed as new and desired to be secured by Letters Patent is:

1. An apparatus for testing a rocket motor case having a thrust skirt thereon comprising upper and lower load bearing plates, tie rods extending between said plates whereby any load that is subjected to said upper plate is transmitted to said lower plate and the skirt on the rocket motor case that is positioned on the lower load bearing plate, a head plate having a convex projection thereon secured to said upper load bearing plate, a piston having a concavity in the upper end thereof to receive said convex projection, means for securing said piston to said head plate whereby said piston extends into the rocket motor case and pivotal movement between said head plate and said piston is achieved, means for sealing the piston within the rocket motor case, and means carried by said head plate for introducing a fluid under pressure into the rocket motor case.

2. An apparatus, as in claim 1, wherein the means for securing said piston to said head plate is a hollow bolt having an outlet tube and an inlet tube associated therewith.

3. An apparatus, as in claim 2, wherein means is provided for sealing said hollow bolt in said piston.

4. An apparatus, as in claim 1, wherein the piston is provided with an enlarged head that is in circumjacent relation to the concavity therein.

5. An apparatus, as in claim 1, wherein a supporting assembly is secured to the lower surface of said lower load bearing plate.

References Cited

UNITED STATES PATENTS

| | | | |
|---|---|---|---|
| 1,431,704 | 10/1922 | Smith | 73—49.1 |
| 2,880,610 | 4/1959 | McCoy | 73—49.2 |

FOREIGN PATENTS

| | | |
|---|---|---|
| 509,590 | 1/1955 | Italy. |

RICHARD C. QUEISSER, *Primary Examiner.*

J. W. MYRACLE, *Assistant Examiner.*